United States Patent
Markou et al.

(10) Patent No.: US 12,169,661 B2
(45) Date of Patent: Dec. 17, 2024

(54) SYSTEM AND METHOD FOR UNIVERSAL MICROPHONE MODULE

(71) Applicant: Automotive Data Solutions, Inc., Montréal (CA)

(72) Inventors: Panayotis Markou, Candiac (CA); André-Philippe Audette, Montreal (CA)

(73) Assignee: Automotive Data Solutions, Inc., Montréal (CA)

( * ) Notice: Subject to any disclaimer, the term of this patent is extended or adjusted under 35 U.S.C. 154(b) by 227 days.

(21) Appl. No.: 17/861,193

(22) Filed: Jul. 9, 2022

(65) Prior Publication Data
US 2024/0012608 A1 Jan. 11, 2024

(51) Int. Cl.
*G06F 3/16* (2006.01)
*H04R 1/08* (2006.01)
*H04R 3/00* (2006.01)

(52) U.S. Cl.
CPC .............. *G06F 3/162* (2013.01); *H04R 1/08* (2013.01); *H04R 3/00* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 2002/0197954 A1* | 12/2002 | Schmitt | H04M 1/6091 455/41.1 |
| 2007/0015486 A1* | 1/2007 | Marlowe | H04N 5/775 455/345 |
| 2013/0139149 A1* | 5/2013 | Boulais | G06F 8/654 717/178 |
| 2014/0149025 A1* | 5/2014 | Fazi | F02N 11/0807 701/113 |
| 2015/0123470 A1* | 5/2015 | Moore | B60R 16/03 307/10.1 |
| 2018/0041236 A1* | 2/2018 | Riggs | B60R 11/0205 |
| 2021/0258689 A1* | 8/2021 | Raley | H04R 5/04 |
| 2021/0291746 A1* | 9/2021 | Wincek | B60R 11/0211 |
| 2022/0410829 A1* | 12/2022 | Kaplan | G06F 3/04847 |

* cited by examiner

*Primary Examiner* — Hemant S Patel
(74) *Attorney, Agent, or Firm* — Trojan Law Offices (57) ABSTRACT

A microphone module system comprising a microphone module with memory. The microphone module is connected to an original factory installed microphone of a vehicle and connected to an aftermarket radio to allow the original factory installed microphone to be compatible with an aftermarket radio. The microphone module includes a computer program that calibrates the factory installed microphone with the aftermarket radio that is originally embedded in the module memory. A method to remotely flash the module comprises steps of transferring a computer program to the microphone module, installing the microphone module in the vehicle, and calibrating the microphone module with the original factory microphone. The computer program may be specific to a make/model of a vehicle or universally applicable to all vehicles.

23 Claims, 9 Drawing Sheets

SYSTEM AND METHOD FOR UNIVERSAL MICROPHONE MODULE

FIELD OF THE INVENTION

The present invention relates to a method and system involving a universal microphone module that is compatible with factory-installed vehicle microphones and after-market radios.

BACKGROUND OF THE INVENTION

Many innovations and technologies have been implemented to modernize motor vehicles, at times borrowing conveniences offered by technologies in other sectors. Consumers now demand vehicles that are both connected to the world at large through wireless internet connections and compatible with their own mobile devices. Thus, vehicle manufacturers have worked with a variety of electronics and software suppliers to create vehicle systems and software that meet these requirements.

With the proliferation of smartphones, tablets, and similar mobile technologies it is a natural evolution that features of those computing products be adapted for vehicles. Thus, many newer vehicles incorporate "infotainment" systems (hereinafter, "radio") that offer many "applications" which may be used to perform one or more tasks for the user. For example, Google's Android operating system has been adapted as an operating system for vehicles, including its many applications for health, lifestyle, entertainment, gaining, shopping, social, tools, and productivity, etc.

Many such applications adapted for vehicles require voice control. This serves to avoid distracting the driver and to allow mobile device usage in vehicles without direct tactile manipulation. Application voice control requires a microphone to be present in the vehicle to facilitate those functions. A microphone is critical to allow a driver to conduct hands free telephone calls while driving a vehicle.

Many modern vehicles include a microphone to transmit an audio signal from within the vehicle to the vehicle's radio. When available, the microphones in vehicles are usually ideally placed to cover areas where voices would typically originate, such as where a driver's head would normally be positioned. As another example, some manufacturers position microphones in the rearview mirror so that it is positioned in front of the driver to pick up the driver's voice. In short, if a vehicle originally includes a microphone, it is likely preplaced in the most optimal position.

Many vehicles have a microphone installed for hands-free telephone calls but lack the capability to run modern applications, like operating systems, that newer vehicles do. Thus, aftermarket equipment manufacturers sell radios with those features to replace aging radios. As an example, an aftermarket radio sold by Pioneer (or other companies such as Alpine, Sony) include functions such as voice commands, hands free control of settings, digital assistants, and/or telephone calls by the aftermarket radio. Since those functions require an in-vehicle microphone to detect and/or transmit a user's voice and manufacturers cannot be sure that each customer's vehicle is equipped with a compatible microphone, the aftermarket radios typically include an aftermarket microphone.

Installing an aftermarket microphone has several drawbacks. For example, it may be difficult to install an aftermarket microphone. The aftermarket microphone must be mounted in a location where it is able to effectively record and transmit the user's voice to the aftermarket radio. For most aftermarket microphone installations, the wire of the microphone must be discreetly routed from the installed location back to the aftermarket radio where the microphone is connected. This burdensome process typically involves taking apart sections of the vehicle to pass wires and drilling holes into the vehicle's body.

The original factory microphone is already conveniently installed in an ideal location. The related wires are already routed and hidden away behind the panels of the vehicle where they can be easily accessed. Thus, retaining the original microphone saves time and effort.

Another complication arises where original factory microphones are placed in the ideal location, but are not compatible with aftermarket radios. There, aftermarket radios are unable to take advantage of existing microphones already installed in the vehicle.

Hence, there is a need for a device that allows consumers to retain the functionality of the original factory microphone and ensure its compatibility with the desired aftermarket radio.

The object of the invention is to provide a system and method to remotely flash a microphone module so that an original factory microphone becomes compatible with an aftermarket radio.

SUMMARY OF THE INVENTION

The system to remotely flash an external module comprises a microphone module, an original factory microphone in a vehicle, an aftermarket radio, a computer, a computer program, a data source, an interface between the microphone module and the aftermarket radio, an interface between the microphone module and the original factory microphone, and a communication method between the microphone module and a computer. In some embodiments, the system also comprises a wire harness that connects to the microphone module and the original factory microphone and the aftermarket radio to act as a bridge between those components.

In other embodiments the computer program is preinstalled and pre-calibrated to allow the microphone module to receive signals from the original factory microphone and transform them to a signal compatible with the installed aftermarket radio. In some embodiments, the computer program can be updated and/or replaced through the remote flashing process described below.

In other embodiments the microphone module is remotely flashed such that a computer program is transferred to the microphone module to allow the microphone module to receive signals from the original factory microphone and transform them to a signal compatible with the installed aftermarket radio.

A method to remotely flash a microphone module generally comprises the steps to electronically transfer a computer program, such as firmware or software, from a computer device to a microphone module, to install the microphone module to a vehicle, disconnect the original factory microphone from the factory radio, connect the factory microphone to microphone module, connect microphone module to the aftermarket radio, calibrate the microphone module to receive a signal from the factory microphone and to ensure a compatible audio signal is sent to the aftermarket radio.

The above system and method address the general lack of compatibility between original factory microphones and aftermarket radios. By preserving the functionality of the original factory radio, consumers installing aftermarket radios need not install a separate aftermarket microphone (which are difficult to locate in an ideal and unobtrusive location without modifying the interior of the vehicle). The consumer not only saves costs but can utilize the original factory microphone that is already placed in an ideal location.

Additionally, the above systems and methods that rely on a remote flashing allows the microphone module to be continually compatible with the advancing technology of microphones in vehicles and functionality in aftermarket radios.

DETAILED DESCRIPTION OF THE SYSTEM

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and to fully convey the scope of the invention to those skilled in the art.

Figure 1:
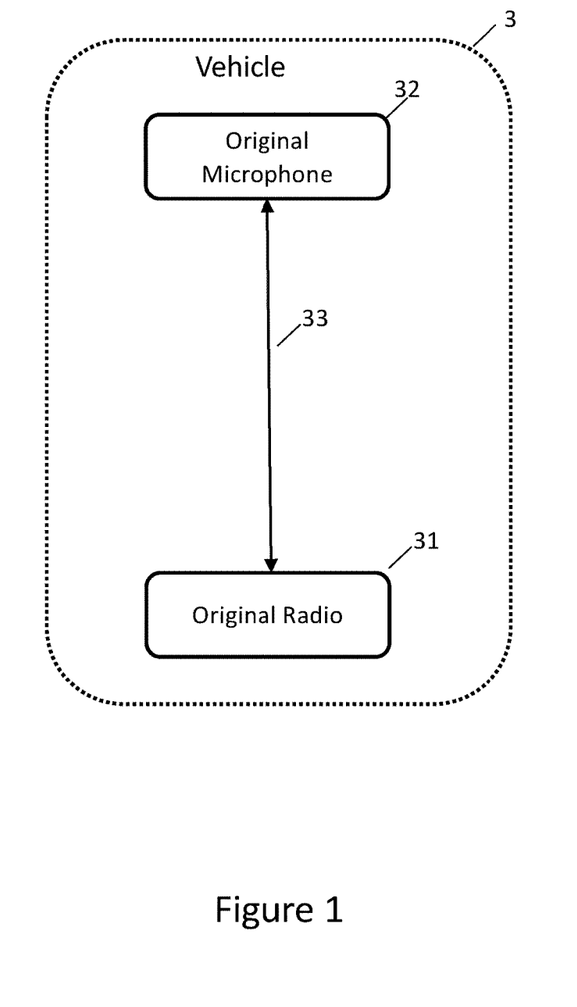
FIG. 1 depicts a prior art vehicle with an original factory radio and original factory microphone.

FIG. 1 depicts the components of an original factory radio 31 and original factory microphone 32 in a vehicle 3. The original factory radio can be referred to by those skilled in the art of vehicle marketing or manufacturing as an "infotainment system", an in-car entertainment system, or in-vehicle infotainment system. In general, these systems are a collection of hardware and software that provide audio or video to the occupants of the vehicle. These systems historically included components such as traditional AM/FM radios and cassette or CD players. These systems now also include global positioning navigation systems, video players, USB and/or Bluetooth connections. These systems are commonly controlled using steering wheel audio controls, touch-sensitive preset buttons, and touch screens. Critically, many systems use hands free voice control, which necessitates a factory-installed original microphone 32 to transmit a vehicle occupant's voice. The original microphone 32 is typically connected to the original radio 31 with an interface 33, such as a wire or a cable that transmits an analog electrical/audio signal and power signals between the components or any interface means known by those skilled in the art.

Figure 2:
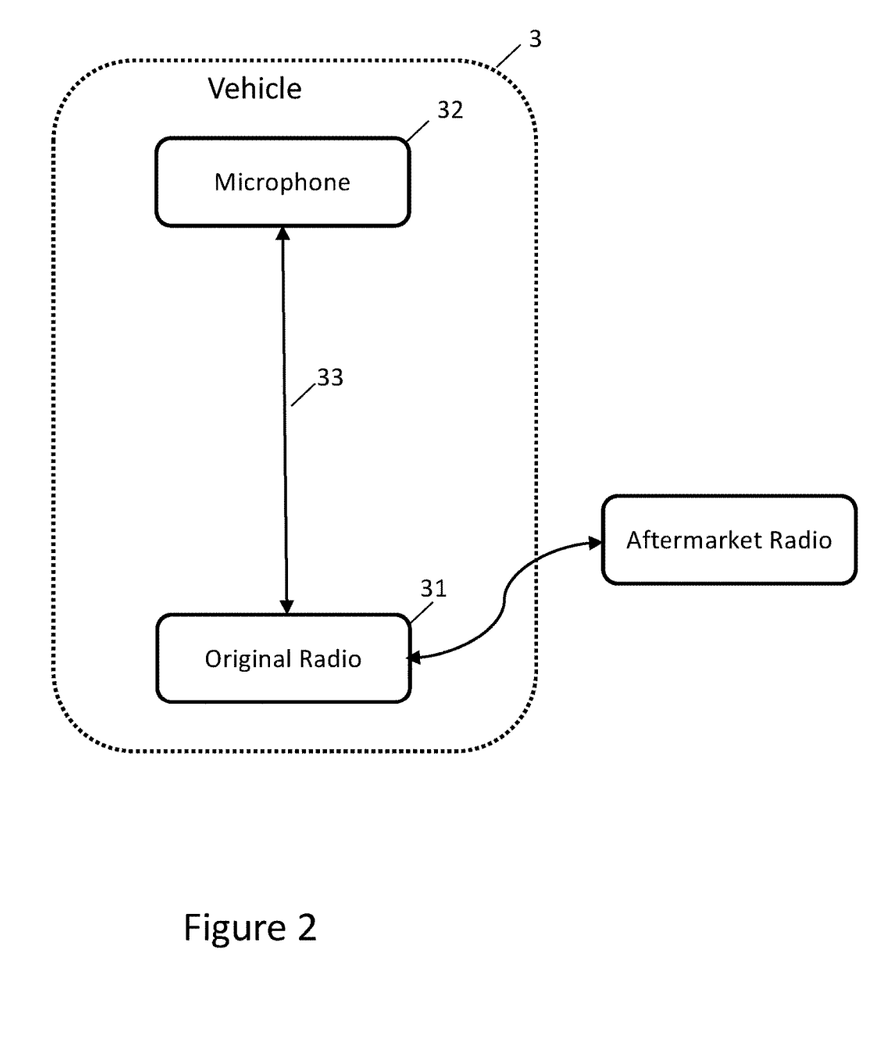
FIG. 2 depicts a prior art vehicle with an original factory radio replaced with an aftermarket radio.
Figure 3:
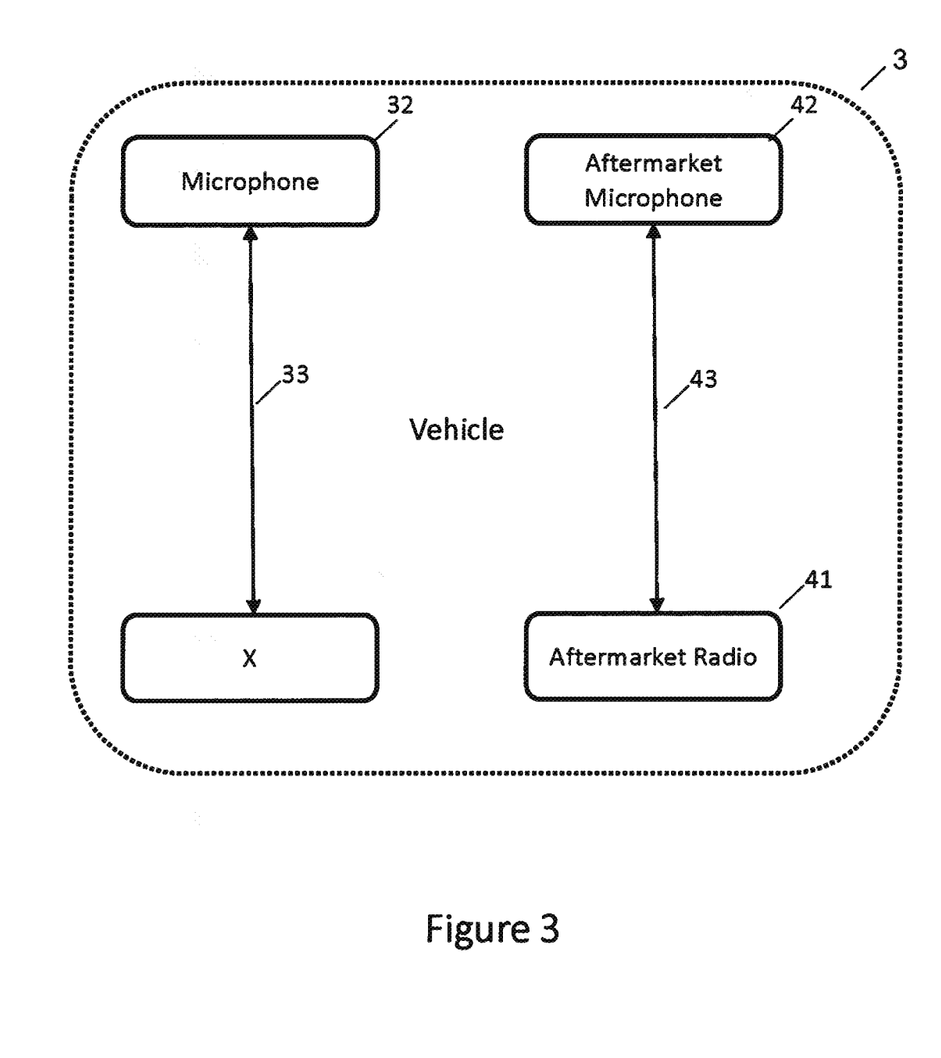
FIG. 3 depicts a prior art vehicle with an aftermarket radio and an aftermarket microphone installed.

FIGS. 2-3 depict the components of a typical installation of an aftermarket radio 41 in the vehicle 3. In installing the aftermarket radio, the original radio 31 is replaced with the aftermarket radio 41. As shown in the FIG. 3, the interface 33 is typically severed and as most original microphones 32 are not compatible with aftermarket radios 41, and aftermarket microphone 42 is installed in the vehicle. The aftermarket microphone 42 is typically connected to the aftermarket radio 41 with an interface 43, such as a wire or a cable that transmits an analog electrical/audio signal and power signals between the components or any interface means known by those skilled in the art.

Figure 4:
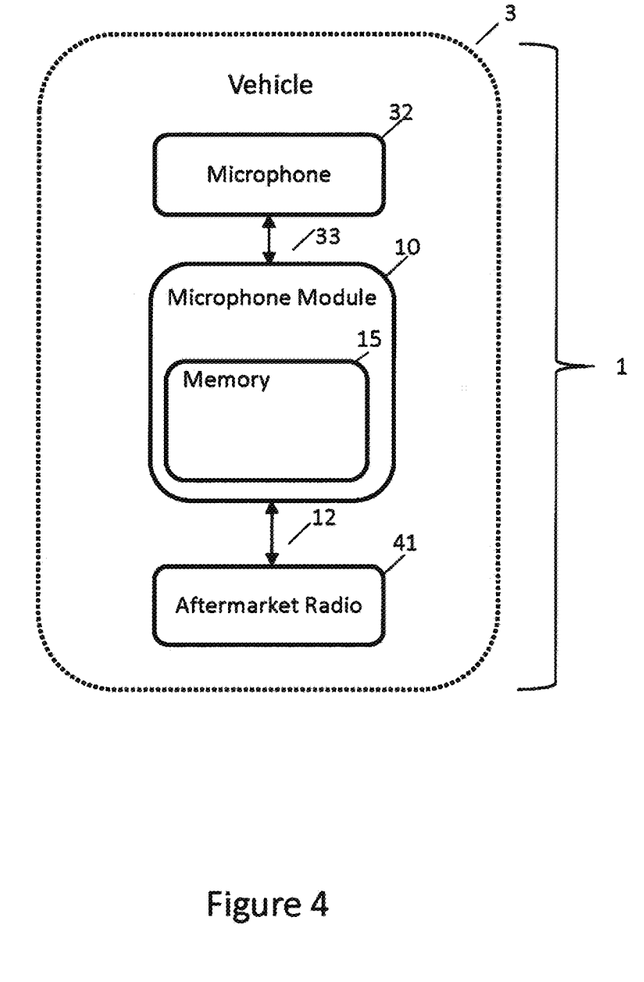
FIG. 4 depicts the system with a microphone module in accordance with an embodiment of the present invention.

FIG. 4 depicts the system 1 of an installed microphone module The system 1 is comprised of a microphone module 10 with memory 15. The microphone module 10 comprises at least one communication port and at least one rewritable memory unit 15. Additionally, the external module may comprise a clock, CPU (such as a microprocessor or any microchip) allowing the execution of a computer program 100.

Figure 5:
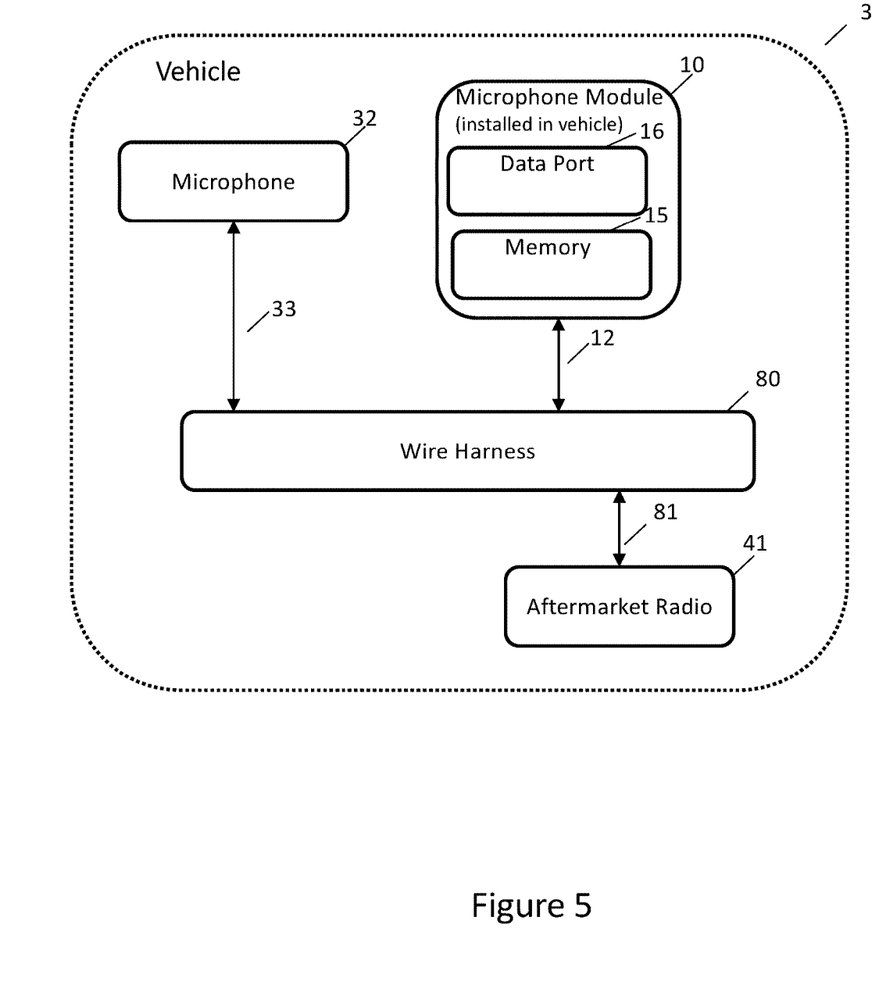
FIG. 5 depicts the system with a microphone module and a wire harness in accordance with an embodiment of the present invention.

As shown in FIG. 5, in the alternative, the microphone module may have a data port 16 (comprising of either a wireless or wired link). The data port 16 may be used to allow a connection to other after-market devices, or to the vehicle 3 to aid in the remote flashing process as discussed more below particularly below.

The microphone module 10 is connected to the original microphone 32 using the interface 33 previously used by the original microphone 32 to connect to the original radio 31. Those skilled in the art may also choose to create a new interface between the original microphone 32 and microphone module 10 without utilizing the interface 33.

The microphone module 10 is also connected to the aftermarket radio 41 using an interface 12. The interface 12 may be a wire or a cable that transmits an analog electrical/audio signal and power signals between the components or any interface means known by those skilled in the art.

FIG. 5 depicts another embodiment of the system 1 also compromising a wire harness 80. The wire harness 80 accepts connections between the microphone 32 and the microphone module 10 using interface 33 and 12, respectively, or using any other interface means known by those skilled in the art as described above.

The harness 80 allows for a simplified "plug-and-play" installation in a vehicle. The harness 80 could be specific to certain makes and models of vehicles 3 to allow the original microphone 32 to be "unplugged" from the original radio 31 and "re-plugged" into the vehicle-specific harness 80 without cutting or splicing wires that may be necessary to connect the original microphone 32 to the aftermarket radio 41.

The wire harness 80 is connected to the aftermarket radio 41 using interface 81. The connection 81 may be a wire, cable, may be a wire or a cable that transmits an analog electrical/audio signal and power signals between the components or any interface means known by those skilled in the art.

Figure 6:
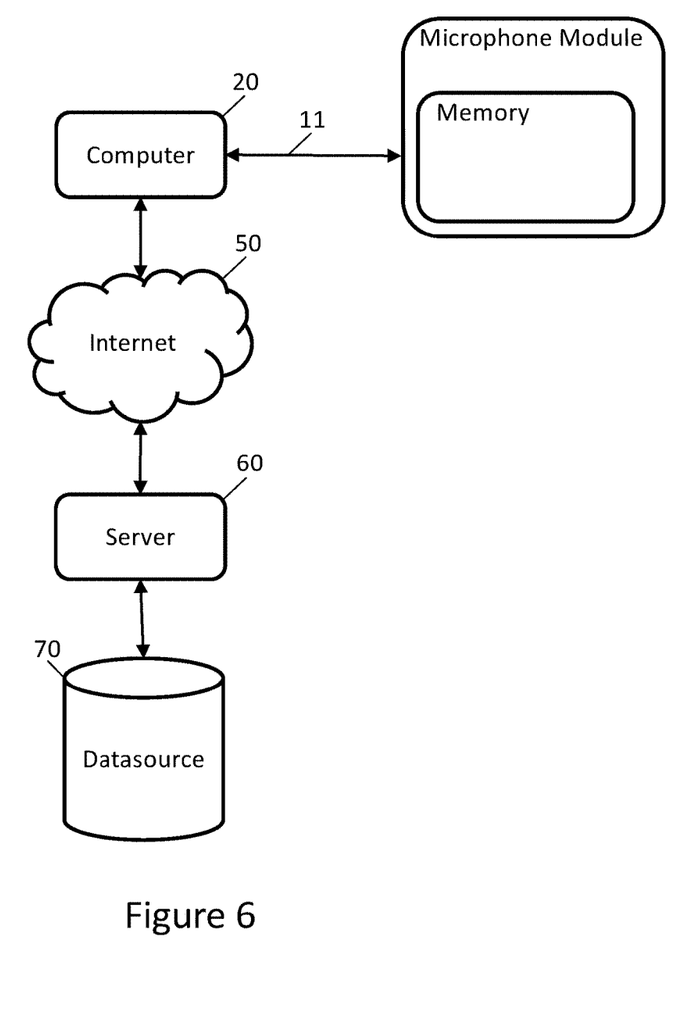
FIG. 6 depicts the system to remotely flash a microphone module in accordance with an embodiment of the present invention.

FIG. 6 depicts the components used to remotely flash the microphone module 10 comprising a microphone module 10, a computer 20 that serves as a means of communication between the microphone module and the server 60.

The microphone module is connected to the computer 20 through connection 11, which is an electronic communication method such as using a computer network transfer protocol such as TCP/IP, wireless network, Bluetooth, or a communication cable, such as a USB or Firewire™ cable. In some embodiments the computer 20 may be a desktop or laptop computer, or a mobile device such as a smartphone or a tablet computer.

The computer 20 accesses the web server 60 through a communication method 50, such as an Internet protocol, a web-service or any remote call procedure. The computer 20 may be configured to access a reference table or data source 70 of computer programs 100 per car model or manufacturer. The web server 60 is compiled and configured to access and fetch the database based on input parameters such as manufacturer or model of the vehicle 3. The computer program 100 may also be universally compatible with all makes and models of original microphones 32 across various makes and models of vehicles.

The data source 70 may include a precompiled table that is structured to store the data required to calibrate the microphone module to the aftermarket radio 41 and original microphone 32 and may make use of indexation information such as the manufacturer, the model and the specifications of the model to optimize the performance of the data source 72.

In another embodiment, the computer 20 may have a direct access to the data source 70 or may manually fetch and retrieve the computer program 100 using a portable medium such as CDROM, USB stick or any portable storage device without requiring an access to a communication network 50.

In another embodiment, the module 10 may have the computer program 100 preinstalled in the memory 15.

The preinstalled computer program 100 may be in the form of preinstalled firmware. The preinstalled computer program 100 allows the module 10 to detect the type of original microphone 32 and after-market radio 41 to which the module 10 is connected and ensures a compatible the signal is sent from the original microphone 32 to the aftermarket radio 41.

To the extent that the microphone module cannot detect the aftermarket radio 41 and microphone 32, the microphone module may have a set of DIP switches or push button to allow the user to manually program the microphone module to allow it translate the signal between the aftermarket radio 41 and microphone 32. As known by those in the art DIP switches are of slide switches on printed circuit boards. In this situation, the microphone module 10 will include a chart that would be organized by vehicle brand/aftermarket radio brand to instruct the user in operating the DIP switches or push button to allow the microphone module 10 to translate the signal between the aftermarket radio 41 and microphone 32.

DETAILED DESCRIPTION OF THE METHOD

The methods to remotely flash a microphone module 10 generally comprises the steps to electronically transfer a computer program 100, such as a firmware or portable software, from a computer device 20 to an microphone module 30, to install the microphone module 10 into a vehicle 3, to connect the microphone module 10 microphone 32, to calibrate the microphone module 10 to allow the microphone module 10 to transfer a compatible audio signal to the aftermarket radio.

In another embodiment, the computer program 100 may comprise a computer program or parameters that are embedded in the microphone module's memory 15. The computer program may also be universally compatible with all makes and models of original microphones 32 across various makes and models of vehicles.

Figure 7:
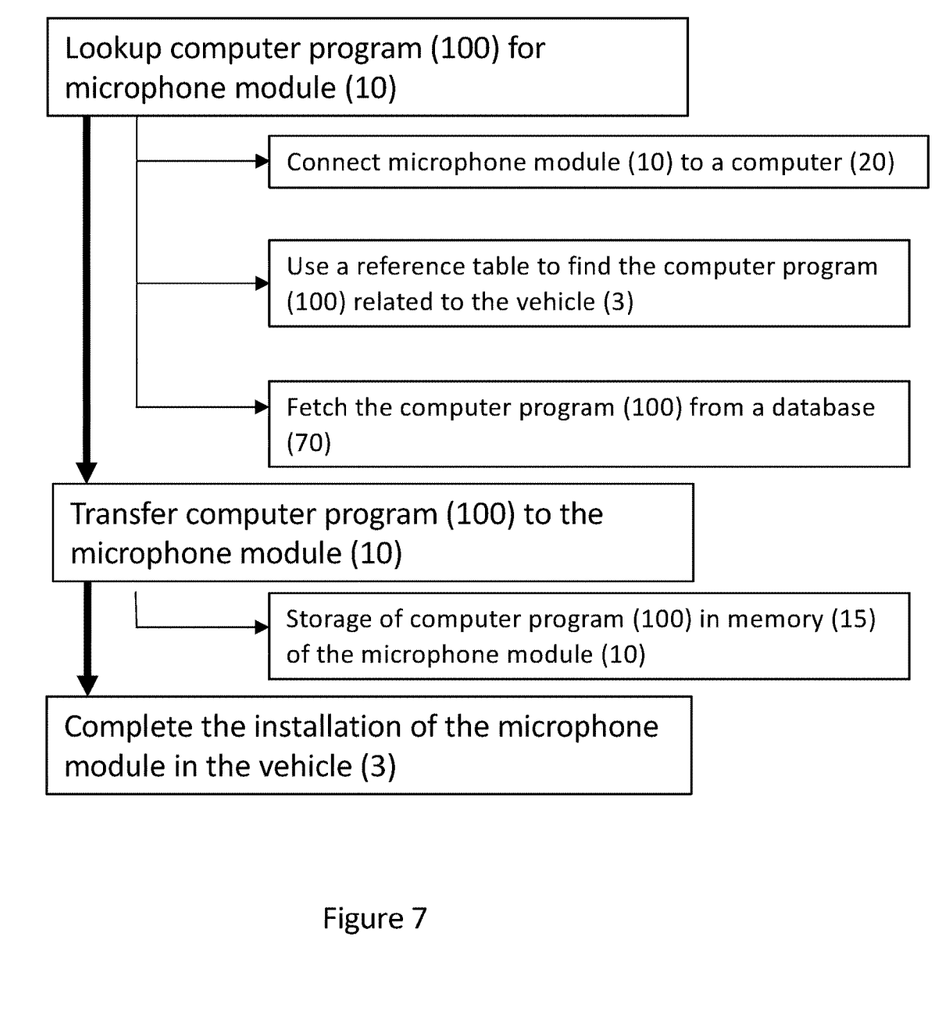
FIG. 7 depicts a schematic illustrating the method to remotely flash a microphone module in accordance with an embodiment of the present invention.

More particularly, FIG. 7, shows one method to remotely flash a microphone module 10. The steps generally comprise of connecting the microphone module 10 to a computer 20, or some equivalent computing device such as a smartphone or tablet computer.

The user will then access the server 60, to select the correct computer program 100 for the microphone module 10 that corresponds to the make and model of the vehicle 3 into which the microphone module 10 will be installed and corresponds to the after-market radio 41 that will be installed. The computer program may also be universally compatible with all makes and models of original microphones 32 across various makes and models of vehicles and after-market radios.

This process may include steps comprising of using a reference table to find the computer program 100 related to the vehicle 3 and after-market radio 41 to which the microphone module 10 must be installed, to fetch, retrieve or order the computer program 100 from a data source 70. The reference table may be an electronic or physical document or be embodied as a searchable data source such as a database, WL file or any other searchable data container. To ensure optimized performances, it shall be noted by the skilled artisan that the reference table may be indexed. The computer program 100 may be retrieved from the data source using client-server architecture or through a browser accessing a web-based application. The data source 70 may be any type of database, such as an XML file or a pre-compiled table.

In another embodiment, the data port 16 (shown in FIG. 5) may allow connection to other after-market devices to aid in the remote flashing process. Instead of the user accessing the server 60 to select the correct computer program 100, the microphone module may be connected using data port 16 to another after-market vehicle component that will communicate with the microphone module 10 to provide it with the information it needs (e.g., Make/Model/Year/trim level, of the vehicle 3 as well as the brand/model of after-market radio 41 being installed) such that the microphone module 10 can retrieve the proper computer program 100 without user input.

In another embodiment, the data port 16 may be an advanced vehicle data bus communication port allows the microphone module 10 to connect to the vehicle's computer network (e.g., CANBUS). Over this network, the microphone module 10 can identify the vehicle's Vehicle Identification Number ("VIN"), which can be used to determine the make and model of type of vehicle 3. With this information, the microphone module 10 can search for the computer program 100 needed to make the original microphone 32 compatible to an aftermarket radio 41 without user input.

After the computer program 100 is identified, it is then transferred to the microphone module 30 which comprises the steps to electronically transfer the securing device bypass 100 from the server 60 to at least one memory unit 15 of the microphone module 10. This uses an electronic communication method like a computer network transfer protocol such as TCP/IP, wireless network, or a communication cable, such as a USB or Firewire™ cable. After the transfer the microphone module 10 is disconnected from the communication hub 10 and installed in the vehicle 3.

In another embodiment, the module 10 may have the computer program 100 preinstalled in the memory 15. For these embodiments, the external module may need to be calibrated with the original microphone 32 and aftermarket radio 41 to enhance the functionality. The calibration sequence may involve the installer talking into the original microphone 32 such that the microphone module 10 will make electrical measurements to detect what aftermarket radio 41 it is connected through the interface 43.

Figure 8:
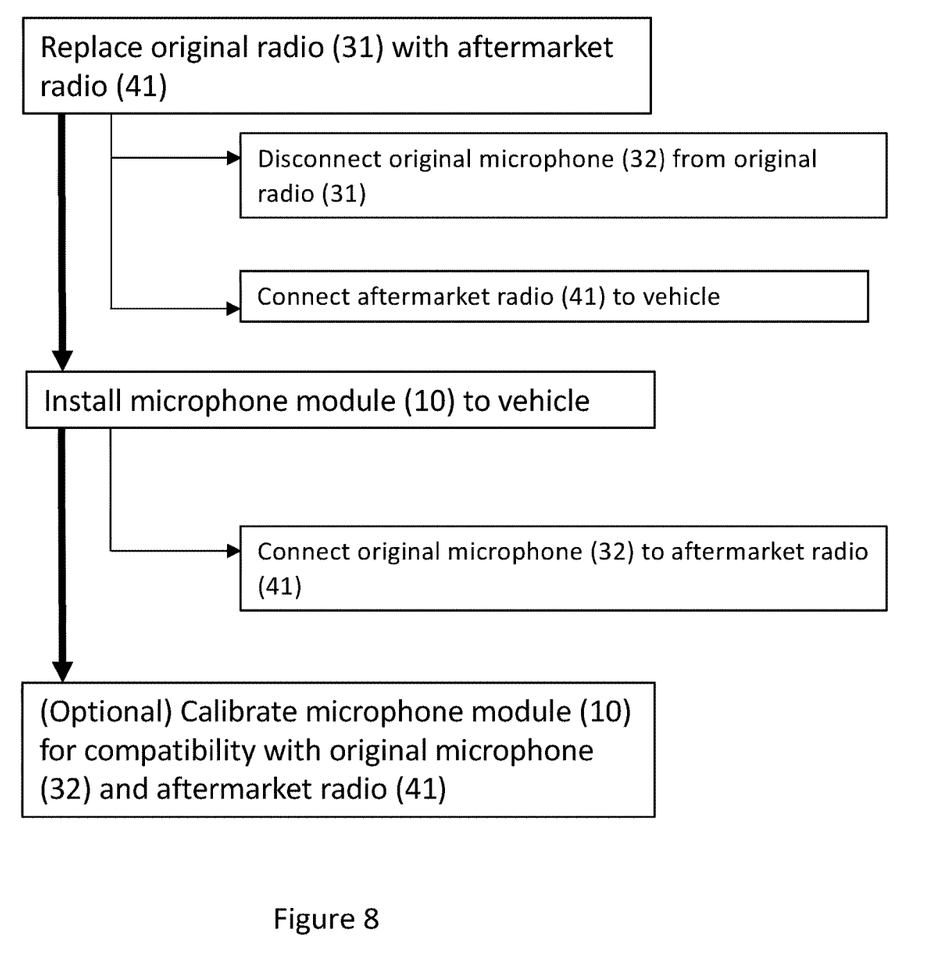
FIG. 8 depicts a schematic illustrating the installation of said microphone module in accordance with an embodiment of the present invention.

FIG. 8 depicts a representative method to install the microphone module 10 into the vehicle 3.

The original radio 31 is removed and replaced with the aftermarket radio 31. The microphone module 10 is then installed in the vehicle and connected to the original microphone 32 using the interface 33 previously used by the original microphone 32 to connect to the original radio 31. The interface is typically a wire or a cable that transmits an analog electrical/audio signal and power signals between the components or any interface means known by those skilled in the art.

Those skilled in the art may also choose to create a new interface between the original microphone 32 and microphone module 10 without utilizing the interface 33.

The microphone module 10 is also connected to the aftermarket radio 41 using interface 12. The interface 12 may be a wire or a cable that transmits an analog electrical/audio signal and power signals between the components or any interface means known by those skilled in the art.

After the installation, the calibration process may take place where the microphone module 10 adjusts to adapt to the various original microphones 32 found in different vehicles 3 in which it will be installed. The microphone module 10 will adjust to adapt to the various aftermarket radios 41.

The calibration process may be a combination of events happening without the need for the user's intervention. For example, the microphone module 10 will automatically make measurements and analyze the information it receives from the original microphone 32 to determine its mode of operation such that it can output a compatible audio signal to the aftermarket radio 41.

In some cases the calibration may require the need for the user to perform actions. For example, the user may need to activate the microphone module 10 while talking into the original microphone 32 so that the microphone can receive an active audio signal and calibrate itself accordingly to output a compatible signal to the aftermarket radio 41.

Figure 9:
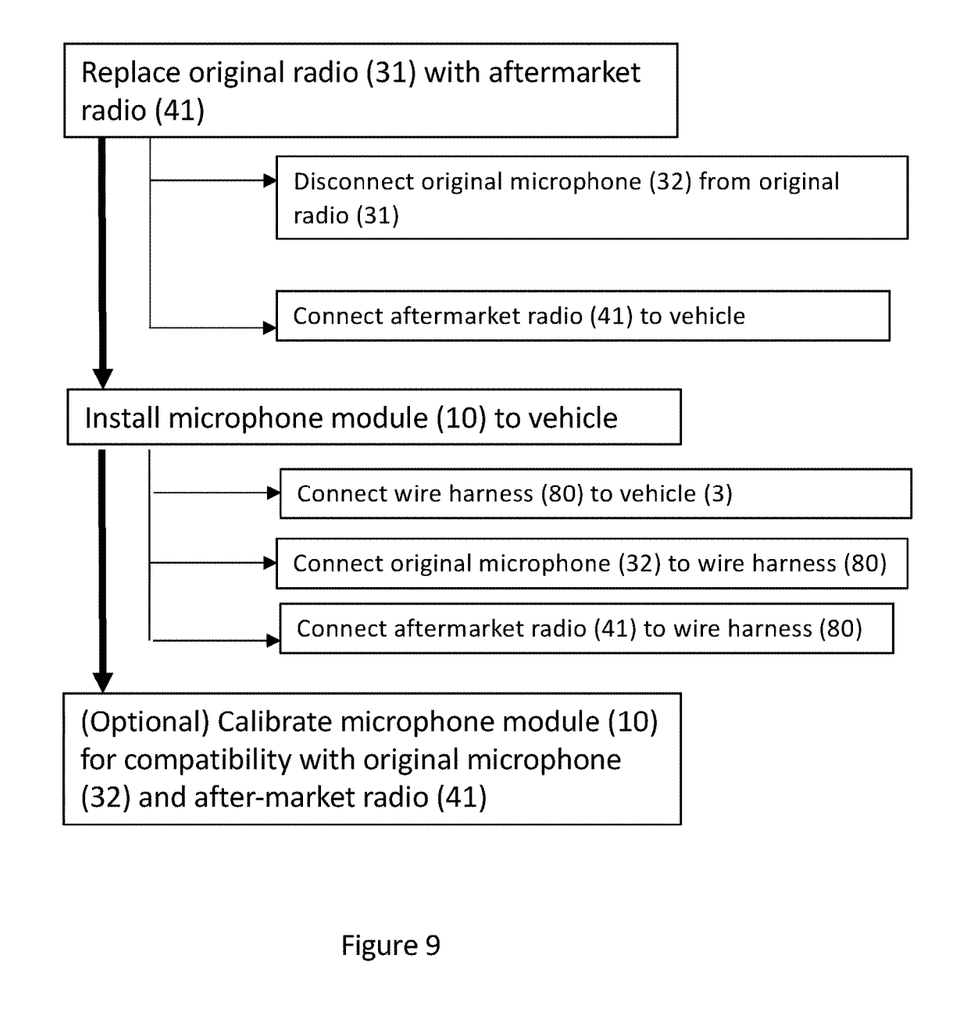
FIG. 9 depicts a schematic illustrating the installation of microphone module and wire harness in accordance with an embodiment of the present invention.

FIG. 9 depicts another method compromising an additional step of installing a wire harness 80. The wire harness 80 interfaces with the microphone 32 and the microphone module 10 using interfaces 13 and 12, respectively, such as a wire or a cable that transmits an analog electrical/audio signal and power signals between the components or any interface means known by those skilled in the art.

The harness 80 allows for a simplified "plug-and-play" installation in a vehicle. The harness 80 could be specific to certain makes and models of vehicles 3 to allow the original microphone 32 to be "unplugged" from the original radio 31 and "re-plugged" into the vehicle-specific harness 80 without cutting or splicing wires that may be necessary to connect the original microphone 32 to the aftermarket radio 41.

The wire harness 80 is connected to the aftermarket radio 41 using interface 81. The connection 81 may be a wire or a cable that transmits an analog electrical/audio signal and power signals between the components or any interface means known by those skilled in the art.

After the installation and during the operation of the microphone module 10, the original microphone 32 can be used to make phone calls, to give voice commands, to activate voice controlled personal assistant applications like Apple's Siri, Google Assistant, Amazon's Alexa, and other voice-controlled applications.

Although the invention is described in terms of specific illustrative embodiments and methods above, it is to be understood that the embodiments and methods described herein are by way of example only and that the scope of the invention is not intended to be limited thereby.

We claim:

1. A module that connects a factory installed microphone of a vehicle to an aftermarket radio by selecting a computer program from a database of computer programs based on an identity of the vehicle and a model of the aftermarket radio, the module comprising:
   a. a first interface facilitating a connection between the module and the factory installed microphone;
   b. a second interface facilitating a connection between the module and the aftermarket radio;
   c. a third interface facilitating a connection between the module and a computer;
   d. wherein the module executes the computer program allowing the module to:
      receive an input signal from the factory installed microphone,
      convert the input signal to an output signal that is compatible with the aftermarket radio, and
      transmit the output signal to the aftermarket radio, thereby allowing the aftermarket radio to communicate with the factory installed microphone.

2. The module of claim 1, wherein the module requires an input from a user.

3. The system module of claim 2, wherein the input from the user is that the user speaks into the factory installed microphone.

4. The module of claim 1, wherein the computer is configured to transfer the computer program to the module.

5. The module of claim 4, wherein the computer retrieves the computer program from a server that contains the database of computer programs.

6. The module of claim 4, wherein the computer is a smartphone.

7. The module of claim 1, wherein the module is a component of the aftermarket radio.

8. The module of claim 1, wherein the module additionally comprises a harness that is connected to the factory installed microphone and connected to the module.

9. The module of claim 1, wherein the module comprises a data port.

10. The module of claim 9, wherein the data port allows the module to connect with after-market accessories other than the aftermarket radio.

11. The module of claim 9, wherein the data port connects to a communication network of the vehicle.

12. The module of claim 1, wherein the module additionally comprises a set of switches.

13. A method to calibrate a universal microphone module, the method comprising:
   a. installing a module to a vehicle with a factory installed microphone and factory installed radio;
   b. disconnecting the factory installed microphone from the factory installed radio and connecting the factory installed microphone to the module;
   c. installing an aftermarket radio into said vehicle to replace the factory installed radio; and,
   d. executing a computer program in the module so that the module receives at least one audio signal from the factory installed microphone, converts said at least one audio signal to an output audio signal that is compatible with said aftermarket radio, and transmits said output audio signal to the aftermarket radio, wherein during the method, an installer of the aftermarket radio activates the module while speaking into the factory installed microphone.

14. The method to calibrate a universal microphone module of claim 13, the method further comprising establishing a connection between the module and a computer and transferring said computer program from said computer to said module.

15. The method to calibrate a universal microphone module of claim 14, the method further comprising establishing a connection between said computer and a server to transfer said computer program from said server to said computer.

16. The method to calibrate a universal microphone module of claim 13, the method further comprising connecting said microphone and a harness and connecting the harness to said module.

17. The method to calibrate a universal microphone module of claim 13, wherein the module allows the factory installed microphone to send audio signals to the aftermarket radio.

18. A method to remotely flash a module, the method comprising:
   a. establishing a connection between a computer and a server;
   b. transferring a computer program from said server to said computer;
   c. establishing a connection between said computer and the module;
   d. transferring said computer program from said computer to said module;
   e. installing said module in a vehicle with a factory installed microphone and a factory installed radio;
   f. disconnecting the factory installed microphone from the factory installed radio and connecting the factory installed microphone to the module;
   g. installing an aftermarket radio into said vehicle to replace the factory installed radio; and,
   h. executing the computer program in the module so that the module can convert input audio signals received from the factory installed microphone to output audio signals that are compatible with the aftermarket radio, thereby allowing the aftermarket radio to be used with the factory installed microphone through the module.

19. The method of claim 18, wherein the module is a component of the aftermarket radio.

20. The method of claim 18, wherein the computer is a smartphone.

21. The method of claim 18 wherein the connection between the computer and the server is wireless.

22. The method of claim 18, wherein the connection between the module and the computer is wireless.

23. The method of claim 18, the method further comprising connecting said microphone and a harness, and connecting the harness and said module.

* * * * *